(12) United States Patent
Hirsch et al.

(10) Patent No.: US 10,982,911 B2
(45) Date of Patent: Apr. 20, 2021

(54) ENTHALPY EXCHANGER ELEMENT, ENTHALPY EXCHANGER COMPRISING SUCH ELEMENTS AND METHOD FOR THEIR PRODUCTION

(71) Applicants: ZEHNDER GROUP INTERNATIONAL AG, Granichen (CH); SYMPATEX TECHNOLOGIES GMBH, Unterfohring (DE)

(72) Inventors: Christian Hirsch, Eibenstock (DE); Stefan Brandt, Haar (DE); Christian Bier, Miesbach (DE); Martin Mayershofer, Scheuring (DE)

(73) Assignees: Zehnder Group International AG, Granichen (CH); Sympatex Technologies GmbH, Unterföhring (DE)

( * ) Notice: Subject to any disclaimer, the term of this patent is extended or adjusted under 35 U.S.C. 154(b) by 0 days.

(21) Appl. No.: 16/320,791

(22) PCT Filed: Jul. 24, 2017

(86) PCT No.: PCT/IB2017/054466
§ 371 (c)(1),
(2) Date: Jan. 25, 2019

(87) PCT Pub. No.: WO2018/020392
PCT Pub. Date: Feb. 1, 2018

(65) Prior Publication Data
US 2019/0186846 A1 Jun. 20, 2019

(30) Foreign Application Priority Data
Jul. 25, 2016 (EP) .................................... 16020276

(51) Int. Cl.
*B01D 53/22* (2006.01)
*F28D 21/00* (2006.01)
(Continued)

(52) U.S. Cl.
CPC ........ *F28D 21/0015* (2013.01); *B29C 43/021* (2013.01); *B29C 43/222* (2013.01);
(Continued)

(58) Field of Classification Search
CPC ... B29C 51/00; B29C 2791/006; B29C 51/10; B29C 2043/023; B29C 43/222;
(Continued)

(56) References Cited

U.S. PATENT DOCUMENTS

| 5,932,497 A * | 8/1999 | Morman ........... A61F 13/15731 442/286 |
| 2006/0090650 A1* | 5/2006 | Yamakawa ........ B01D 67/0009 96/11 |
| 2014/0326432 A1* | 11/2014 | Dean ........................ F28F 9/26 165/54 |

FOREIGN PATENT DOCUMENTS

| EP | 2829834 A1 | 1/2015 |
| EP | 2829836 A1 * | 1/2015 ............ F28F 21/066 |

(Continued)

OTHER PUBLICATIONS

International Search Report dated Feb. 1, 2018 for PCT/IB2017/054466.

*Primary Examiner* — Anthony R Shumate
(74) *Attorney, Agent, or Firm* — Maxwell L. Minch; Maxwell L Minch Esq. PA

(57) ABSTRACT

The present invention provides enthalpy exchanger elements (E, E', PR, PF) and enthalpy exchangers comprising such elements. Furthermore, the invention discloses a method for producing such enthalpy exchanger elements and enthalpy (Continued)

exchangers, comprising the steps of a) providing an air-permeable sheet element (1); b) laminating at least one side (1a, 1b) of the sheet element (1) with a thin polymer film (3, 4) with water vapor transmission characteristics; and c) forming the laminated sheet element (1) into a desired shape exhibiting a three-dimensional corrugation pattern (5, 5, ... ).

24 Claims, 12 Drawing Sheets

(51) Int. Cl.
*F28F 21/06* (2006.01)
*B29C 51/14* (2006.01)
*B29C 51/00* (2006.01)
*B29C 43/02* (2006.01)
*F28F 3/04* (2006.01)
*B29C 43/22* (2006.01)
*B32B 5/02* (2006.01)
*B32B 27/12* (2006.01)
*B29L 31/18* (2006.01)
*B29C 51/10* (2006.01)

(52) U.S. Cl.
CPC ............ *B29C 51/00* (2013.01); *B29C 51/145* (2013.01); *B32B 5/022* (2013.01); *B32B 27/12* (2013.01); *F28F 3/046* (2013.01); *F28F 3/048* (2013.01); *F28F 21/065* (2013.01); *B29C 51/10* (2013.01); *B29C 2043/023* (2013.01); *B29C 2791/006* (2013.01); *B29L 2031/18* (2013.01); *F28F 2245/02* (2013.01); *F28F 2245/04* (2013.01)

(58) Field of Classification Search
CPC . B29C 43/021; B29C 51/145; B29L 2031/18; F28F 3/046; F28F 2245/02; F28F 21/065; F28F 3/048; F28F 2245/04; F28D 21/0015; B32B 5/022; B32B 27/12
See application file for complete search history.

(56) References Cited

FOREIGN PATENT DOCUMENTS

| | | |
|---|---|---|
| EP | 2829836 A1 | 1/2015 |
| WO | 2015006856 A1 | 1/2015 |

* cited by examiner

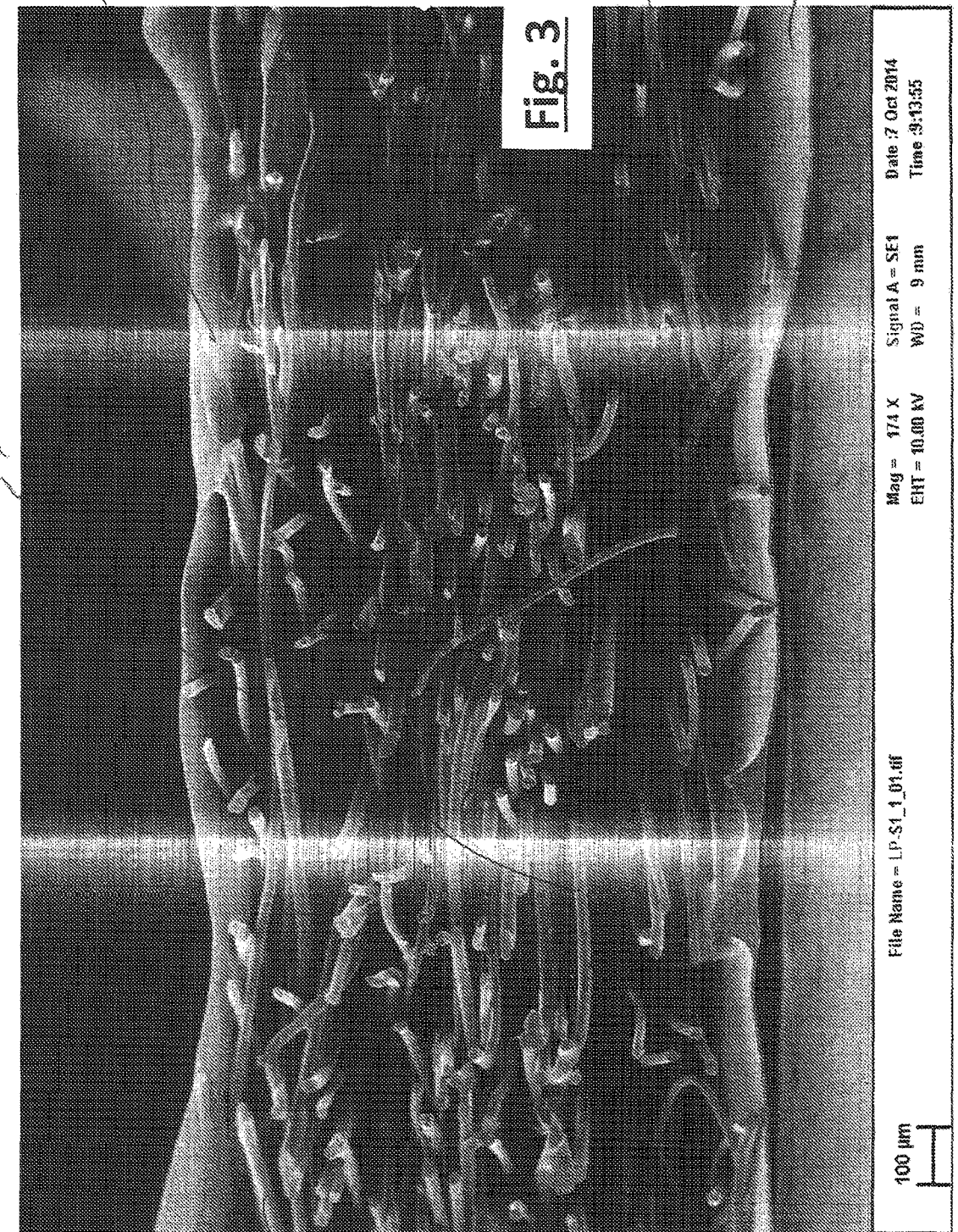

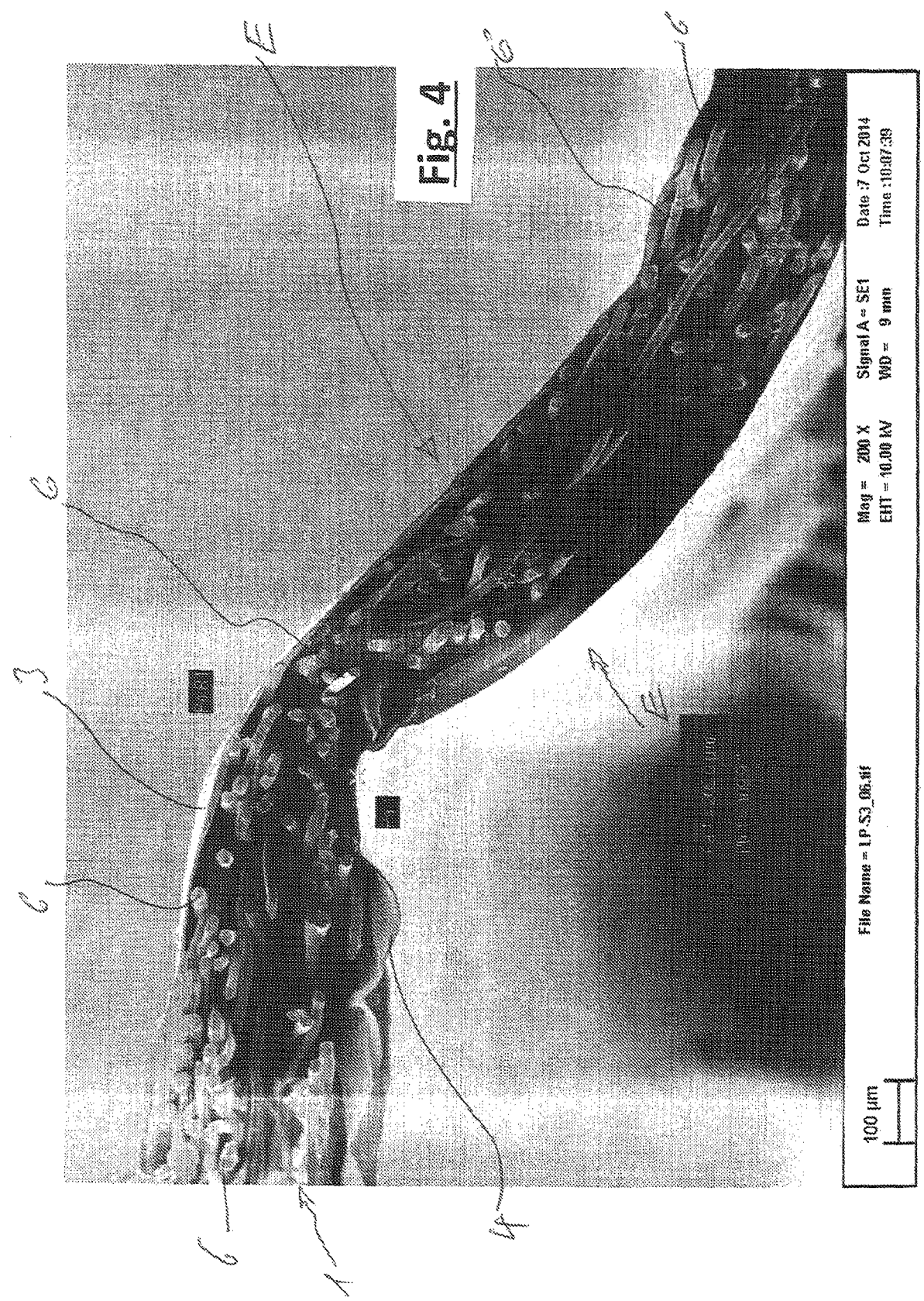

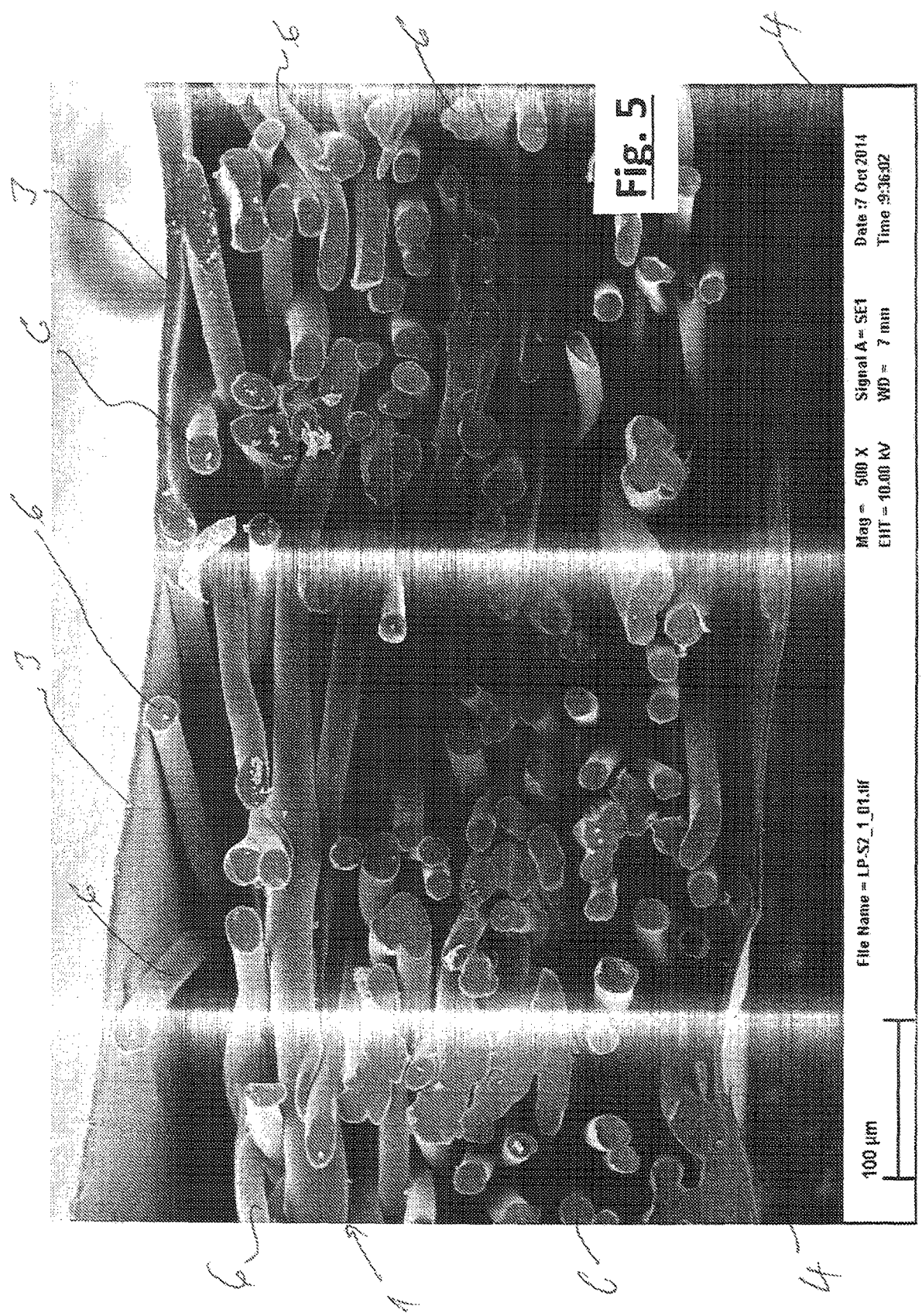

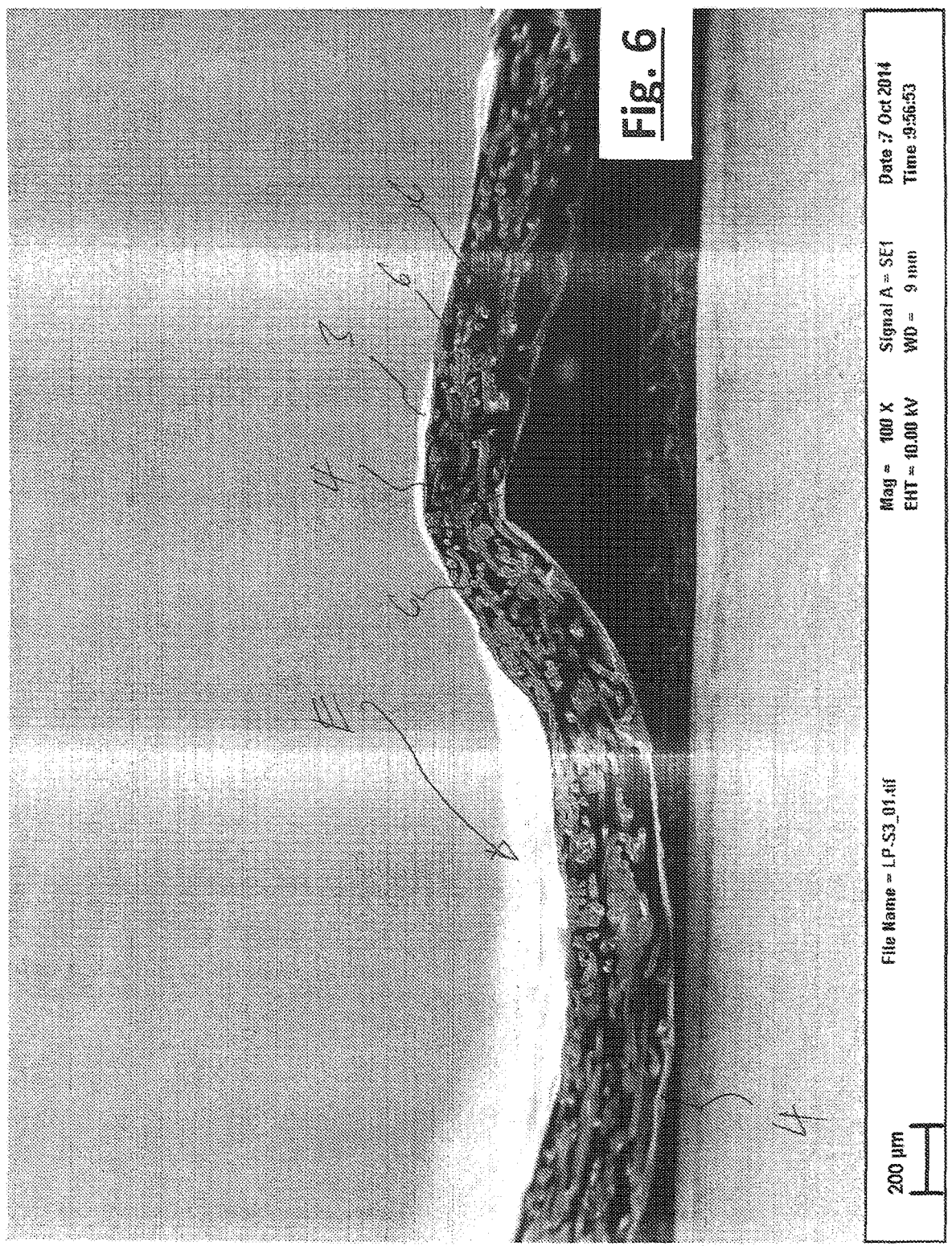

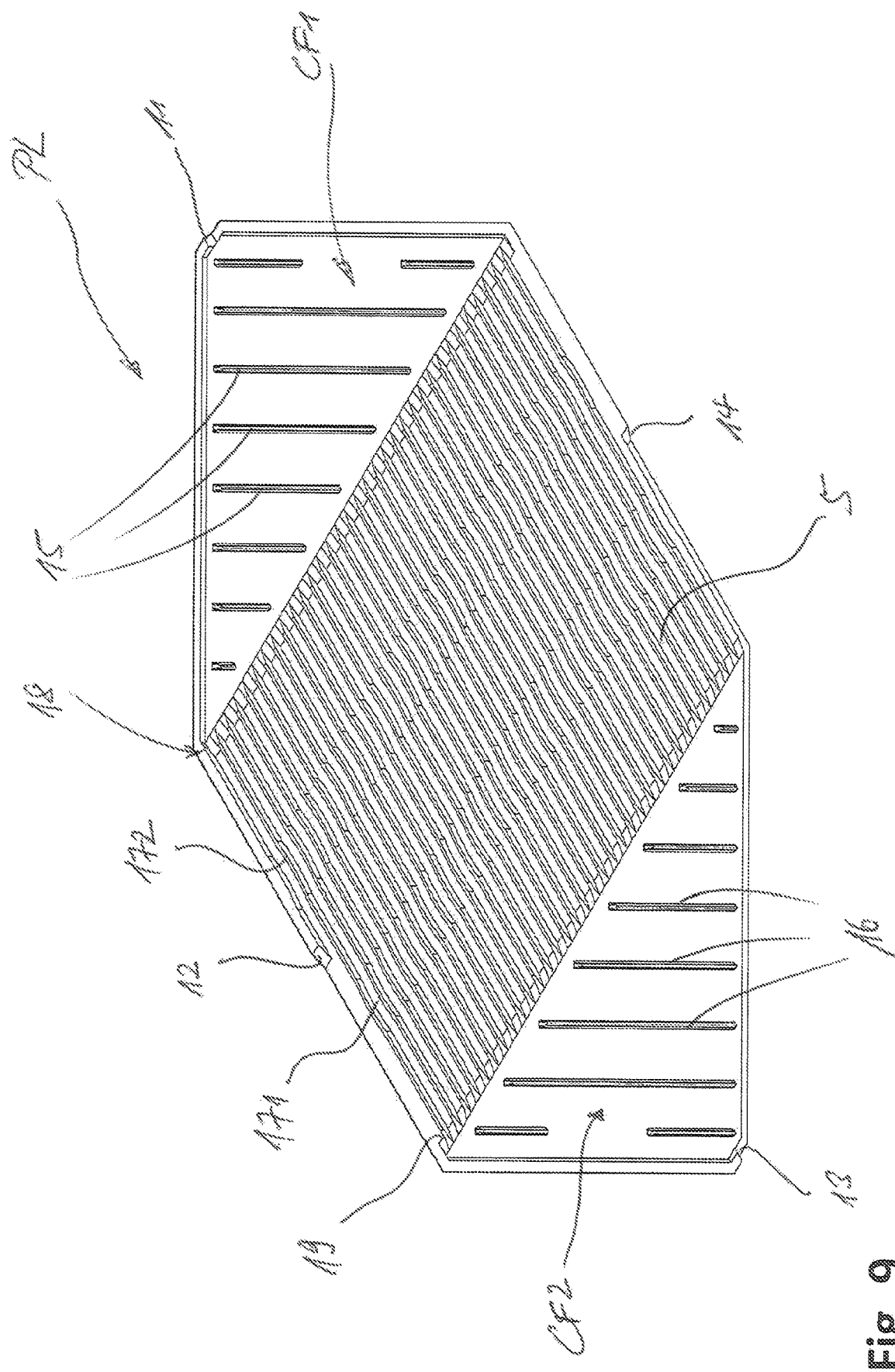

ENTHALPY EXCHANGER ELEMENT, ENTHALPY EXCHANGER COMPRISING SUCH ELEMENTS AND METHOD FOR THEIR PRODUCTION

The present invention refers to enthalpy exchanger elements and enthalpy exchangers comprising such elements. Furthermore, the invention discloses a method for producing such enthalpy exchanger elements and enthalpy exchangers.

It is well known to use different kinds of heat exchangers for different purposes. Usually, heat exchangers are used to recover heat energy from one fluid or medium into another one. This kind of heat energy is called sensible energy. The heat energy or sensible energy of one fluid, normally air, is recovered into another one which is running adjacent, e.g. parallel, counter or cross flow, to the first where the fluid is at lower temperature. By inversing fluid flows, the exchange between the two will generate a cooler fluid. Heat exchangers used for sensible energy recovery are usually made of metal or polymer elements. There are different types, as there can be cross flow, parallel flow or counter flow configurations. The elements are defining flow channels between themselves so that the fluids can flow between the elements. Such devices are e.g. used in residential and commercial ventilation (HRV).

Another type of energy exchangers refers to the so called latent energy which includes the moisture in the air. To exchange the latent energy it is known to use desiccant coated metal or polymer substrates or membranes made from desiccant impregnated cellulose or polymer. Between plates made from cellulose or polymer, air passages are defined or created to allow the fluids to pass along the surface of the plates, thereby transferring moisture from one fluid to the other one. As the membranes usually have no structural strength, it is known to combine the membranes with frames or grids which thereby define spacings between the membranes.

In case of a combination of the above, i.e. heat exchange and moisture exchange, the energy exchangers are called enthalpy exchanger. Those enthalpy exchangers allow for the exchange of sensible and latent energy, resulting in total energy recovery.

Membrane materials as currently available are delivered by the roll. The membrane material is the most critical part of an enthalpy exchanger. The membrane must be fixed and sealed to a kind of grid or frame and arranged in a way to allow for a fluid to flow between each membrane layer. So, it is obvious that enthalpy exchangers of the known art are a compromise. They will usually lose in sensible energy exchange to gain in latent energy exchange as a result of the selective scope and characteristics of currently used membranes.

Such an enthalpy exchanger built from respective elements is e.g. WO 02/072242 A1. On grids, respective membranes made of fibers are positioned. Grids containing a membrane or spacers between adjacent membranes, i.e. spacers and membranes in alternating sequence, are stapled or stacked, thereby altering the direction of the plates in order to create different air flow directions.

In view of the mentioned state of the art, it is an object of the invention to provide enthalpy exchanger elements and enthalpy exchangers as well as a method for their production which allow for the creation of enthalpy exchangers where the efficiency of both sensible energy exchange and latent energy exchange in each enthalpy exchanger element is increased and where the manufacturing cost of enthalpy exchanger elements and enthalpy exchangers made of such elements is reduced.

It is another object of the invention to provide enthalpy exchanger elements and enthalpy exchangers with a high specific exchange area for water vapor, as well as a method for their production.

In order to achieve this object, the invention provides a method for producing enthalpy exchanger elements comprising the steps of
a) providing an air-permeable sheet element;
b) laminating at least one side of the sheet element with a thin polymer film with water vapor transmission characteristics; and
c) forming the laminated sheet element into a desired shape exhibiting a three-dimensional corrugation pattern.

As a result, an enthalpy exchanger element is obtained which allows both the transfer of heat and water molecules in the form of vapor across the element from one side of the element to the other side of the element almost throughout the entire surface area of the element which now has a higher specific exchange area than such elements in the prior art. In contrast, molecules larger or less polar than water molecules, such as carbon dioxide and odor-related molecules, are barred from passing across the element. In addition, the sheet element and the selectively water vapor transmissible barrier material laminated to at least one side of the sheet element are formed into the desired corrugated shape using only one forming step ("one-step forming"). Thus, in the enthalpy exchanger element according to the invention, total (i.e. sensible plus latent) energy transfer efficiency is increased on the one hand while manufacturing cost is reduced on the other hand.

Alternatively, the sequence of steps b) and c) in the method may be switched, i.e. forming the (not yet laminated) sheet element into a desired shape exhibiting a three-dimensional corrugation pattern and then laminating at least one side of the formed sheet element with a thin polymer film with water vapor transmission characteristics ("two-step forming").

In particular, the method for producing enthalpy exchanger elements may comprise a cutting step after the laminating step b). Preferably, during steps a) and b) an air-permeable web material, typically provided by unrolling from a roller, and a thin polymer film, typically provided by film extrusion, are joined together in the laminating step b) by heat fusion and/or gluing, in order to prepare a continuous air-tight web comprising a continuous air-permeable support layer laminated with a continuous air-tight thin polymer film with water vapor transmission characteristics.

The laminating step b) is followed by the cutting step.

In a first variant, the cutting step may be an additional intermediate step between the laminating step b) and the forming step c). Preferably, the continuous laminated web is first cut into separate laminated sheet elements comprising an air-permeable support layer laminated with a continuous air-tight thin polymer film with water vapor transmission characteristics. Next, each of the laminated sheet element is formed into a desired shape exhibiting a three-dimensional corrugation pattern. In other words, the continuous laminated web is first fed through a cutting station comprising a cutting tool and then through a forming station comprising a forming tool.

In a second variant, the cutting step may be an additional step within the forming step c), i.e. a part of the forming step. Preferably, the continuous laminated web is simultaneously cut and formed into separate laminated sheet elements comprising an air-permeable support layer laminated with a continuous air-tight thin polymer film with water vapor transmission characteristics and having a desired shape exhibiting a three-dimensional corrugation pattern. In other words, the continuous laminated web is fed through a combined cutting and forming station comprising a cutting tool and a forming tool. Preferably, the cutting tool and the forming tool are associated to each other, preferably coupled to each other. They may be rigidly coupled to each other or resiliently coupled to each other. As a first alternative, the cutting tool and the forming tool may have a positional relationship such that during the combined cutting and forming step the cutting tool engages the laminated web before the forming tool engages the laminated web. As a second alternative, the cutting tool and the forming tool may have a positional relationship such that during the combined cutting and forming step the cutting tool engages the laminated web at the same time as the forming tool engages the laminated web. As a third alternative, the cutting tool and the forming tool may have a positional relationship such that during the combined cutting and forming step the cutting tool engages the laminated web after the forming tool engages the laminated web.

Water vapor transmission characteristics means a water vapor transmission rate of at least 500 g/m$^2$/24 h, preferably of at least 1000 g/m$^2$/24 h, even more preferably of at least 1500 g/m$^2$/24 h and most preferred of at least 2000 g/m$^2$/24 h, as measured using the upright cup method according to modified ASTM E 96-66 B; modifications: $T_{water}$=30° C., $T_{air}$=21° C., rel. humidity=60%, air flow=2 m/s.

Step c) of forming the laminated sheet element into a desired shape exhibiting a three-dimensional corrugation pattern may include a first step c1) and a second step c2).

Step c1) comprises forming a first corrugation pattern or reinforcing corrugation pattern with corrugations extending in a first direction and having a relatively fine structure. The first corrugation pattern may have a sinusoidal, rectangular or triangular periodic profile. Preferably, this first periodic profile of the first corrugation pattern has a period of 0.5 mm to 2 mm and an amplitude of 0.5 mm to 1 mm. The first corrugation pattern may comprise adjacent ridges. There may be a spacing between neighboring ridges, i.e. the space of the laminated or not yet laminated sheet element between neighboring ridges is a substantially flat region and the neighboring ridges may protrude in the same or in opposite directions from the sheet element. The height or depth as well as the width of these individually located ridges may be 0.2 mm to 1 mm. The ridge spacing may be 1 to 10 times the ridge width.

This optional first step c1) contributes to the overall stiffness of the enthalpy exchanger element.

Step c2) comprises forming a second corrugation pattern or main corrugation pattern with corrugations extending in a second direction and having a relatively coarse structure defining the heat exchanger plate channel cross section geometry. Again, the second corrugation pattern may have a sinusoidal, rectangular or triangular periodic profile, but with larger dimensions than the first corrugation pattern. Preferably, this second periodic profile of the second corrugation pattern has a period of 2 mm to 10 mm and an amplitude of 2 mm to 10 mm.

As a result, the optional first step c1) and the necessary second step c2) provide an enthalpy exchanger element with double corrugation and enhanced rigidity.

The first direction, i.e. the direction of the ridges of the first corrugation pattern, forms an angle with respect to the second direction, i.e. the direction of the ridges of the second corrugation pattern, preferably an angle of 45° to 90°, more preferably an angle of 85° to 90° and most preferably about 90°.

The sheet material of the sheet element may comprise a polymer, preferably a thermoplastic polymer. Thus, the sheet element lends itself for instance to thermal processing in the forming step c). Preferably, polystyrene (PS), polyvinyl chloride (PVC), viscose or polyester, such as polyethylene terephthalate (PET), or co-polyester are selected as thermoplastic polymer. Preferably, the polymer of the sheet material does not include any plasticizer. The polymer of the sheet material may include a biocide (bactericide and/or fungicide).

In a preferred embodiment, the sheet element is a fabric, preferably a nonwoven fabric. The fabric may include thermoplastic fibers only or a combination of thermoplastic fibers and thermoset fibers or a combination of thermoplastic fibers and a resin or a combination of thermoplastic fibers and inorganic fibers. Most preferably, the fabric includes multicomponent or bicomponent fibers together with standard thermoset and/or thermoplastic fibers. Preferably, the fabric includes more than 50 wt. % multicomponent or bicomponent fibers and may include multicomponent or bicomponent fibers only. In addition, the fabric may include metal fibers and/or wick fibers providing high thermal conductivity together with mechanical strength and high capillary action ("humidity conductivity"), respectively. The inorganic fibers may be glass fibers, silicon carbide fibers or any mineral fiber.

Alternatively, the sheet element is a woven fabric, preferably having an anisotropic structure and anisotropic properties resulting therefrom. For instance, the woven fabric may have thicker polymer fibers in a first fiber direction and thinner polymer fibers in a second fiber direction. The second fiber direction may be between 90° and 100°, preferably about 90°, with respect to the first fiber direction. Due to the thicker polymer fibers in the first fiber direction, the anisotropic woven fabric can withstand more stretching along the first fiber direction without being mechanically weakened (or even damaged) than along the second fiber direction with thinner polymer fibers.

Alternatively, the sheet element may comprise a nonwoven fabric which may have an anisotropic structure and anisotropic properties resulting therefrom, and a woven fabric, preferably having an anisotropic structure and anisotropic properties resulting therefrom.

The sheet element may comprise additional reinforcement fibers for providing extra strength. These reinforcement fibers may be at least one of metal fibers, carbon fibers or thermoplastic polymer fibers. The reinforcement fibers may extend in a first general direction within the sheet element. Preferably, the reinforcement fibers are non-straight. In particular, they may have a wave-like pattern, e.g. with a triangular or sinusoidal flat pattern, preferably having periods of 1 mm to 3 mm and amplitudes of 1 mm to 3 mm. Alternatively, they may have a curly shape, e.g. a helical shape, preferably having a helix diameter of less than 1 mm.

The reinforcement fibers may be continuous fibers or staple fibers with minimum length of 5 mm. The metal fibers may be selected from aluminum, copper, silver or steel fibers having a diameter between 10 µm and 200 µm, preferably between 20 µm to 100 µm.

Preferably, the first general direction of the wave-like pattern and/or the curly shape of the reinforcement fibers form an angle with respect to the direction of the second corrugation pattern defining the heat exchanger plate channel cross section geometry. Preferably, they form an angle of 45° to 90°, more preferably an angle of 85° to 90° and most preferably an angle of about 90° with respect to each other.

During step c) or in particular during steps c1) and c2), but primarily during step c2), the non-straight reinforcement fibers are straightened out. In particular, the wave-like pattern and/or the curly shape is stretched and thus flattened in profile, i.e. the amplitude of the wave-like pattern is reduced and its period is increased and/or the diameter of the curly/helical shape is reduced and its period (or pitch) is increased. Once the non-straight carbon and/or metal fibers are completely straightened out, the sheet element will be prevented from further stretching along the first general direction.

In addition, if the sheet element is heated beyond the softening temperature of the thermoplastic polymer fibers before or during step c) or in particular before or during steps c1) and/or c2), the thermoplastic fibers will be deformed by undergoing local stretching and/or bending. After the forming step c) or the forming steps c1) and c2), the permanent deformation of the thermoplastic polymer fibers will contribute to the dimensional stability, i.e. shape retention, of the enthalpy exchanger element.

Preferably, if carbon fibers are included within the sheet element, they extend along the second direction of the second (main) corrugation pattern. Thus, during forming step c) or during forming sub step c2), the carbon fibers will not undergo any bending. However, they contribute to the overall strength of the sheet element before and after the forming step c) or c2).

Preferably, if metal fibers are included within the sheet element, they may extend along whatever directions within the sheet element. Thus, during forming step c) or during forming sub step c2), the metal fibers will undergo bending under metal cold deformation conditions even if the sheet element is heated beyond the softening temperature of thermoplastic polymer fibers. After the forming step c) or the forming steps c1) and c2), the permanent deformation of the metal fibers will contribute to the dimensional stability, i.e. shape retention, of the enthalpy exchanger element.

Preferably, the fibers of the fabric have fiber diameters between 1 µm and 40 µm, more preferably between 3 µm and 40 µm and most preferably between 5 µm and 20 µm. As a result, when the fabric is laminated with the thin polymer film with water vapor transmission characteristics in the laminating step b), the fabric fibers in direct contact with the thin polymer film will cover only a small portion of the surface of the thin polymer film, thus minimizing any blocking of the thin polymer film. In addition, even if not permanently deformed as described above for thermoplastic polymer fibers or metal fibers, any fabric fibers undergoing elastic bending during step c) will have a high degree of flexibility which helps make the forming step c) easier to perform.

Preferably, the fibers or fabric filaments within the sheet element and in particular those at a non-laminated surface of the sheet element, may have linear mass densities (filament weights) between 1 and 10 dtex (1 tex=1 g/1000 m; 1 dtex=1 g/10000 m). Such fine fibers exhibit a strong wicking effect alloying them to transport humidity faster. In addition, when used at a sheet surface or at both sheet surfaces, they provide a smoother and less abrasive surface. First, this helps reduce the risk of damage to a very thin adjacent functional membrane layer laminated to the respective surface. Second, this helps prevent the formation any air boundary layer at a non-laminated sheet surface.

The fibers of the fabric may have substantially circular, triangular or oval cross-sections. Also, the fibers of the fabric may have X-type or star-like cross-sections. The fabric may include fibers having different cross-sections, preferably chosen from the mentioned types of cross-sections.

In addition, the fabric may include a surface impregnant, preferably a thermoplastic or thermoset polymer, in order to improve structural stability after the forming step. In addition or as an alternative, the fabric may include a surface impregnant which can be cross-linked after the forming step c), preferably a resin which can be cured by UV irradiation after the forming step c).

The fabric or the enthalpy exchanger element may include a hydrophobically treated layer on one of its sides and a thin polymer film on the other side, i.e. a single water repellant impregnation.

This can be achieved by laminating only one side of the fabric with a thin polymer film with water vapor transmission characteristics in step b) and providing the other side of the fabric with a hydrophobization treatment before, during or after the laminating step b). The hydrophobization treatment may be carried out even after the forming step c).

Preferably, the hydrophobization treatment of the fabric is carried out before the laminating step b). i.e. before, during or after the providing step a). This prevents the thin polymer film with water vapor transmission characteristics to be accidentally rendered hydrophobic on its surface facing the fabric.

The fabric or the enthalpy exchanger element may include a hydrophobically treated layer on both of its sides and a thin polymer film inside extending in between and "in parallel" to the first hydrophobically treated layer and to the second hydrophobically treated layer of the fabric or the enthalpy exchanger element, i.e. a double water repellant impregnation.

This can be achieved by the following steps:

First, providing one side of a first fabric or the entire first fabric with a hydrophobization treatment before, during or after any laminating step b).

Second, providing one side of a second fabric or the entire second fabric with a hydrophobization treatment before, during or after any laminating step b).

Third, laminating one side of the first fabric with a first side of a thin polymer film with water vapor transmission characteristics.

Fourth, laminating one side of the second fabric with a second side of the thin polymer film with water vapor transmission characteristics producing a sandwich structure having the thin polymer film sandwiched between the first fabric and the second fabric.

Finally, according to step c), this laminated sheet element having a first fabric/thin film/second fabric type sandwich structure is formed into a desired shape exhibiting the three-dimensional corrugation pattern.

Preferably, steps three and four are carried out at the same time, i.e. co-laminating or one-step laminating the first fabric and the second fabric with the one thin polymer film with water vapor transmission characteristics producing the sandwich structure with the thin polymer film sandwiched between the two fabric sheets.

Preferably, the hydrophobization treatment of the first fabric and/or the second fabric is carried out before any laminating step b). i.e. before, during or after the fabric providing step a). Again, this prevents any thin polymer film with water vapor transmission characteristics to be accidentally rendered hydrophobic on its surface facing the fabric, i.e. first fabric or the second fabric.

Instead, the hydrophobization treatment of the first fabric and/or the second fabric may be carried out after the forming step c).

The sheet element may be composed of one layer of fabric comprising any of the combinations of fibers mentioned in the previous paragraph. Alternatively, the sheet element may be composed of several, preferably two or three, stacked layers of fabric attached to each other and each comprising a different one of the combinations of fibers mentioned in the previous paragraph.

The several stacked layers of fabric may have different filament weights. They may comprise a first layer having relatively fine filaments, e.g. 1 to 10 dtex, and a second layer having relatively coarse filaments, e.g. 10 to 40 dtex.

Preferably, the second layer with the coarser or heavier filaments is attached to the thin polymer film (membrane), providing a small direct contact area between the sheet element surface and the thin polymer film attached to it, thus increasing the active membrane surface area of the thin polymer film. Preferably, at least a portion of the heavier filaments are bicomponent fibers allowing the thin polymer film to be attached to the sheet element surface with less glue or no glue at all.

Alternatively, depending on the type of filaments, it can be advantageous if the first layer with finer filaments is contacted with and attached to the thin polymer film (membrane), providing a smooth surface at the sheet element/thin polymer film interface that does not damage the polymer film during the forming step c) of forming the corrugation pattern or during the forming sub step c2) of forming the second corrugation pattern or during end use.

Irrespective of its position within the sheet element, the second layer with heavier or thicker filaments will provide an open and highly air and vapor permeable layer of the sheet element.

In addition, the sheet element may comprise fine filaments or fibers with strong wicking properties to enhance transport of humidity through the sheet element. Preferably, the fine filaments or fibers, when measured according to DIN 53924, exhibit rising heights of at least 30 to 60 mm after 30 seconds and more preferably rising heights of at least 40 to 60 mm after 30 seconds.

If the forming in step c) or in step c2) is done by vacuum forming with the support of an upper pleating tool, the sheet element may have an asymmetric structure across its thickness. In particular, it may have a layer with relatively fine filaments on the vacuuming side, providing good replication of the mold geometry, and relatively coarse filaments facing the upper pleating tool, providing the required structural strength to the sheet element.

The sheet element may comprise a layer of nonwoven fabric and a layer of woven fabric attached to each other. Preferably, the woven fabric has an anisotropic structure and anisotropic mechanical properties resulting therefrom, as described above.

A portion of the fibers within the sheet element, preferably 5 to 60 wt. %, may be hollow fibers. A portion of the fibers within the sheet element, preferably 20 to 70 wt. %, may be bicomponent fibers. These bicomponent fibers may have circular and/or non-circular cross sections.

A portion of the fibers within the sheet element, preferably 5 to 60 wt. %, may be hydrophilic fibers showing strong wicking properties to increase transport of humidity. Preferably, such wicking fibers are hydrophilic on their surface and hydrophobic in their center.

A portion of the fibers within the sheet element, preferably 5 to 30 wt. %, may be water absorbing fibers, preferably hydro polymers, to create a water buffer for excess humidity.

The sheet element may have a textured surface and/or an integrated grid structure.

As a result, this type of sheet element will cover a minimum surface area of the adjacent thin polymer film attached to the sheet element. The integrated grid structure may be the above-described first or reinforcing corrugation pattern formed in the first forming step c1).

In addition or as an alternative to the above-described measures for increasing the structural strength of the sheet element,
1) hydroentanglement and/or spunlacing; and/or
2) surface texturing; and/or
3) integration of a grid structure with a pattern adapted to the geometry of the second or main corrugation pattern may be applied to the not yet laminated sheet element before subsequent lamination.

In addition or as an alternative to the above-described measures for increasing the structural strength and the formability of the sheet element, the sheet element may be made with an anisotropic fiber distribution providing higher overall strength of the sheet element and/or higher strength in a preferred direction of the sheet element. In particular, as mentioned above, the anisotropic fiber distribution may be provided by at least one of carbon fibers, metal fibers or thermoplastic polymer fibers included in at least one of the several layers of the sheet element.

Preferably, the metal fibers and/or thermoplastic polymer fibers are oriented in close-to-orthogonal relationship with respect to the second direction of the second (main) corrugation pattern or they may extend along whatever directions within the sheet element. Preferably, the carbon fibers are oriented in parallel to the second direction of the second (main) corrugation pattern.

The laminating step b) may comprise bonding, preferably heat bonding, welding and/or gluing, of the thin polymer film to the sheet element. Preferably, a thermoplastic adhesive (hot melt adhesive), a thermoset adhesive or a UV-curable adhesive is used for the bonding between the polymer film and the sheet element.

In a preferred embodiment, the thin polymer film is a monolithic membrane, i.e. a poreless membrane exhibiting a solution-diffusion transport mechanism for individual water molecules. Preferably, this monolithic membrane has a maximum elongation between 100% and 300%, more preferably between 150% and 200%.

In a further preferred embodiment, the thin polymer film is a multilayer film comprising a sequence of polymer layers of different polymer types. Thus, with a few given polymer types, thin polymer films of different water vapor transmission characteristics can be designed and produced.

Preferably, the polymer type of each polymer layer is selected from the group consisting of polyether ester, polyether amide and polyether urethane.

Preferably, the total thickness of the thin polymer multilayer film is between 5 µm and 200 µm, more preferably between 10 µm and 150 µm.

The thickness of each individual polymer layer within the thin polymer multilayer film may be between 1 µm and 20 µm, preferably between 4 µm and 20 µm and most preferably between 4 µm and 15 µm.

In general, the polymer film(s) or polymer layer(s) should be as thin as possible for high transport rates. In the setup of the enthalpy exchanger element according to the invention, the limiting layer for transport of water vapor is the three-dimensional sheet element located next to the one polymer laminate or between the two polymer laminates. In order to achieve mechanical strength and robustness of the laminate(s) on the one hand and high transport rates on the other hand, a setup is chosen with a polymer film (laminate) thickness between 1 μm and 20 μm, preferably between 4 μm and 20 μm and most preferably between 4 μm and 15 μm. Also, the three-dimensional sheet element is a thin as possible and as permeable as possible. Preferably, the sheet element is a fabric having a thickness between 200 μm and 600 μm, preferably between 300 μm and 500 μm. Preferably, the sheet element is a fabric having a fiber volume portion between 10% and 65% of the fabric volume, preferably between 20% and 50% of the fabric volume.

Preferably, the thermoplastic polymer(s) of the thin polymer film does not include any plasticizer. Instead, the thin polymer film may include a biocide (bactericide and/or fungicide). The biocide will help prevent growth of bacteria and fungi on the polymer and thus achieve longer operation periods without cleaning.

As mentioned above with respect to the thermoplastic polymer, the forming step c) may be a pleating step or thermoforming step, preferably a vacuum forming step. At least a first mold part (e.g. lower tool) having first corrugation formations co-defining the predetermined corrugation pattern of the enthalpy exchanger element to be manufactured, is provided in the thermoforming step. In addition to the at least first mold part, a second mold part (e.g. upper tool) having second corrugation formations complementary to the first corrugation formations and/or a forming vacuum co-defining the predetermined corrugation pattern of the enthalpy exchanger element to be manufactured, is/are provided in the thermoforming step.

Preferably, prior to the actual forming operation of the laminated sheet element at a specific predetermined forming temperature of the first mold part or at specific predetermined forming temperatures of the first and second mold parts, the laminated sheet element is preheated to a preheating temperature a few degrees below the forming temperature, preferably to a preheating temperature between 5K and 30K below its forming temperature, more preferably between 10K and 20K below its forming temperature. For pleating, the preheating temperature of the laminated sheet may be lower. Preferably, for pleating, the preheating temperature is 10K to 40 K below the forming temperature, more preferably between 15K and 30K below the forming temperature of the laminated sheet.

Preferably, prior to the forming step, the laminated sheet is preheated throughout its thickness to a uniform preheating temperature. This allows all the polymer fibers to be heated close to their softening or melting temperature. Preferably, the fabric inside the laminated sheet comprises multicomponent fibers having a first polymer material at their surface and a second polymer material inside the multicomponent fibers and with the first polymer material having a lower softening or melting point than the second polymer material. Preferably, the multicomponent fibers are bicomponent fibers.

Preferably, at least the multicomponent fibers comprise a polymer material having polar functional groups. More preferably, at least the first polymer material at the multicomponent fibers' surface comprises polar functional groups. Alternatively, only the first polymer material at the multicomponent fibers' surface comprises polar functional groups.

Preferably, when multicomponent fibers are included in the laminated sheet, the preheating temperature of the laminated sheet is a temperature between the melting point or softening point of the first polymer material of the multicomponent fibers at their surface and the melting point or softening point of the second polymer material inside the multicomponent fibers.

Alternatively, when multicomponent fibers are included in the laminated sheet, the preheating temperature of the laminated sheet is a temperature between the melting point of the first polymer material of the multicomponent fibers at their surface and the melting point of the second polymer material inside the multicomponent fibers.

Preferably, the forming temperature is provided by internally heated first and/or second mold parts.

Preferably, the preheating temperature is provided by exposing the not yet formed laminated sheet to electromagnetic radiation (e.g. at infrared or microwave frequencies) and/or to mechanical waves (e.g. at ultrasonic frequencies).

The invention also provides an enthalpy exchanger element, preferably produced using the method as defined in the previous paragraphs, including a sheet element and a predetermined corrugation pattern, wherein a first thin polymer film is laminated to a first side of the sheet element and/or a second thin polymer film is laminated to a second side of the sheet element, both thin polymer films having water vapor transmission characteristics.

The first thin polymer film and the second thin polymer film may be identical to each other. If both sides of the sheet element are laminated, an enthalpy exchanger element having excellent hygienic properties is obtained. If only one side of the sheet element is laminated, the thermoplastic polymer of the sheet material preferably undergoes a hydrophobization treatment and/or includes a biocide (bactericide and/or fungicide) and again, an enthalpy exchanger element having excellent hygienic properties is obtained.

The first thin polymer film and the second thin polymer film may be different from each other. This provides additional freedom to adjust and optimize the heat and moisture transfer characteristics of the enthalpy exchanger element.

Finally, the invention provides an enthalpy exchanger having at least three sheet-like or plate-like enthalpy exchanger elements as defined in any of the previous paragraphs, which are stacked onto and fixed to each other with their respective corrugation patterns in orthogonal or parallel orientation to form orthogonal or parallel fluid paths allowing fluids to flow there through. The individual enthalpy exchanger elements may be fixed to each other and sealed by welding, preferably using pinch welding or laser welding, and/or gluing, preferably using epoxy.

In order to achieve this object, the invention provides a method for producing an enthalpy exchanger comprising the steps of a) providing an air-permeable sheet element;
b) laminating at least one side of the sheet element with a thin polymer film with water vapor transmission characteristics;
c) forming the laminated sheet element into a desired shape exhibiting a three-dimensional corrugation pattern;
d) repeating steps a), b) and c) to produce a plurality of laminated and formed sheet elements exhibiting a three-dimensional corrugation pattern;
e) stacking the plurality of laminated and formed sheet elements; and
f) fixing the stacked laminated and formed sheet elements to each other.

In a first variant, the laminated and formed sheet elements are stacked such that the corrugation patterns of adjacent elements in the stack are parallel to each other. As a result, a counter-flow enthalpy exchanger is obtained.

In a first variant, the laminated and formed sheet elements are stacked such that the corrugation patterns of adjacent elements in the stack are orthogonal to each other. As a result, a cross-flow enthalpy exchanger is obtained.

Preferably, the method comprises the steps of
a1) providing a first air-permeable sheet element;
b1) laminating at least one side of the first sheet element with a thin polymer film with water vapor transmission characteristics;
c1) forming the first laminated sheet element into a first desired shape exhibiting a first three-dimensional corrugation pattern;
d1) repeating steps a1), b1) and c1) to produce a plurality of laminated and formed first-type sheet elements exhibiting a first three-dimensional corrugation pattern;
a2) providing a second air-permeable sheet element;
b2) laminating at least one side of the second sheet element with a thin polymer film with water vapor transmission characteristics;
c2) forming the second laminated sheet element into a second desired shape exhibiting a second three-dimensional corrugation pattern;
d2) repeating steps a2), b2) and c2) to produce a plurality of laminated and formed second-type sheet elements exhibiting a second three-dimensional corrugation pattern;
e) stacking the plurality of laminated and formed first-type sheet elements and second-type sheet elements to obtain a stack with alternating first-type sheet elements and second-type sheet elements; and
f) fixing the stacked laminated and formed sheet elements to each other.

Preferably, the first-type sheet elements have a first shape and the second-type sheet elements have a second shape complementary to the first shape. In particular the first-type sheet elements are right-handed sheet elements and the second-type sheet elements are left-handed sheet elements.

In the following description, two non-limiting embodiments of the invention are described in further detail below with reference to the drawings, wherein:

FIG. 3 is a SEM (scanning electron microscope) micrograph of a cross-sectional view of a portion of an intermediate product produced during the method for producing an enthalpy exchanger element according to the invention;

FIG. 4 is a SEM micrograph of a cross-sectional view of a portion of an enthalpy exchanger element produced by the method according to the invention;

FIG. 5 is a SEM micrograph similar to the one of FIG. 3 showing of a larger scale cross-sectional view of a smaller portion of an intermediate product produced during the method for producing an enthalpy exchanger element according to the invention;

FIG. 6 is a SEM micrograph similar to the one of FIG. 4 showing of a smaller scale cross-sectional view of a larger portion of an enthalpy exchanger element produced by the method according to the invention;

FIG. 9 is a schematic perspective view showing a left-handed enthalpy exchanger sheet element of a second embodiment according to the invention;

Figure 10:
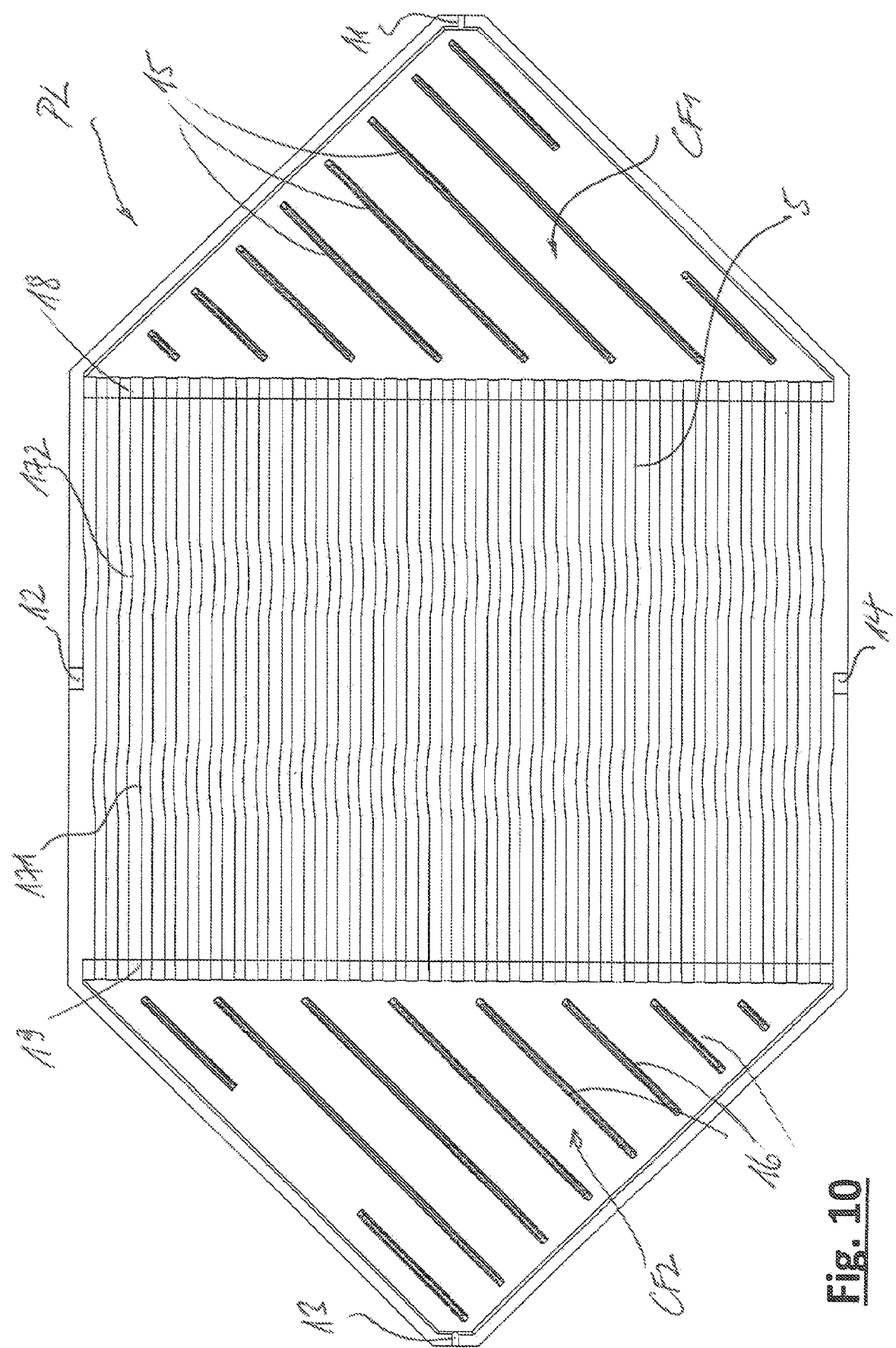
FIG. 10 is a schematic plan view showing the left-handed enthalpy exchanger sheet element of the second embodiment according to the invention.
Figure 12:
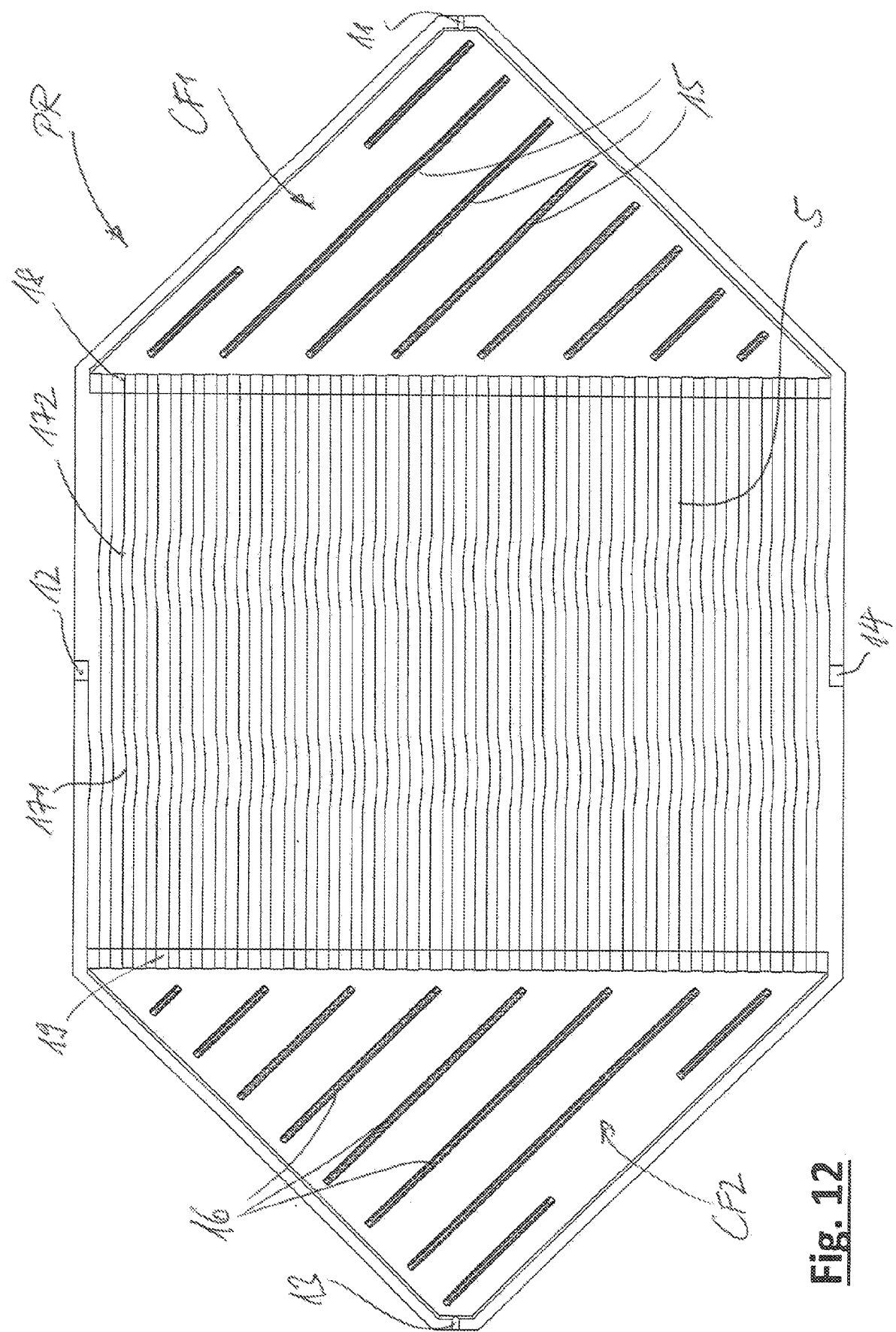
Figure 13:
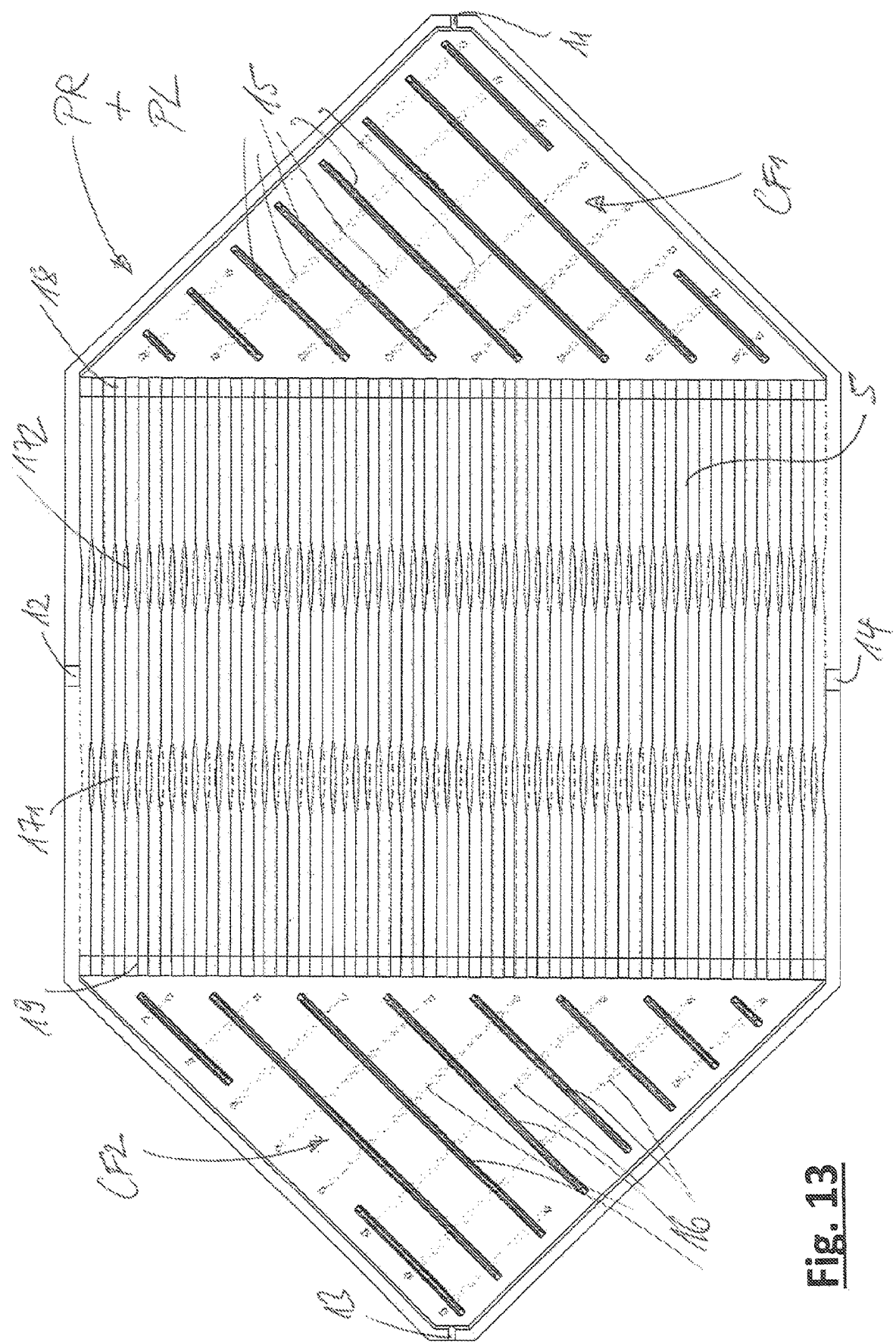

FIG. 12 is a schematic plan view showing the right-handed enthalpy exchanger sheet element of the second embodiment according to the invention; and FIG. 13 is a schematic plan view showing a pair of enthalpy exchanger sheet elements stacked one on top of the other, one being the left-handed enthalpy exchanger sheet element as shown in FIG. 10 and the one other being the right-handed enthalpy exchanger sheet element as shown in FIG. 12.

Figure 1:
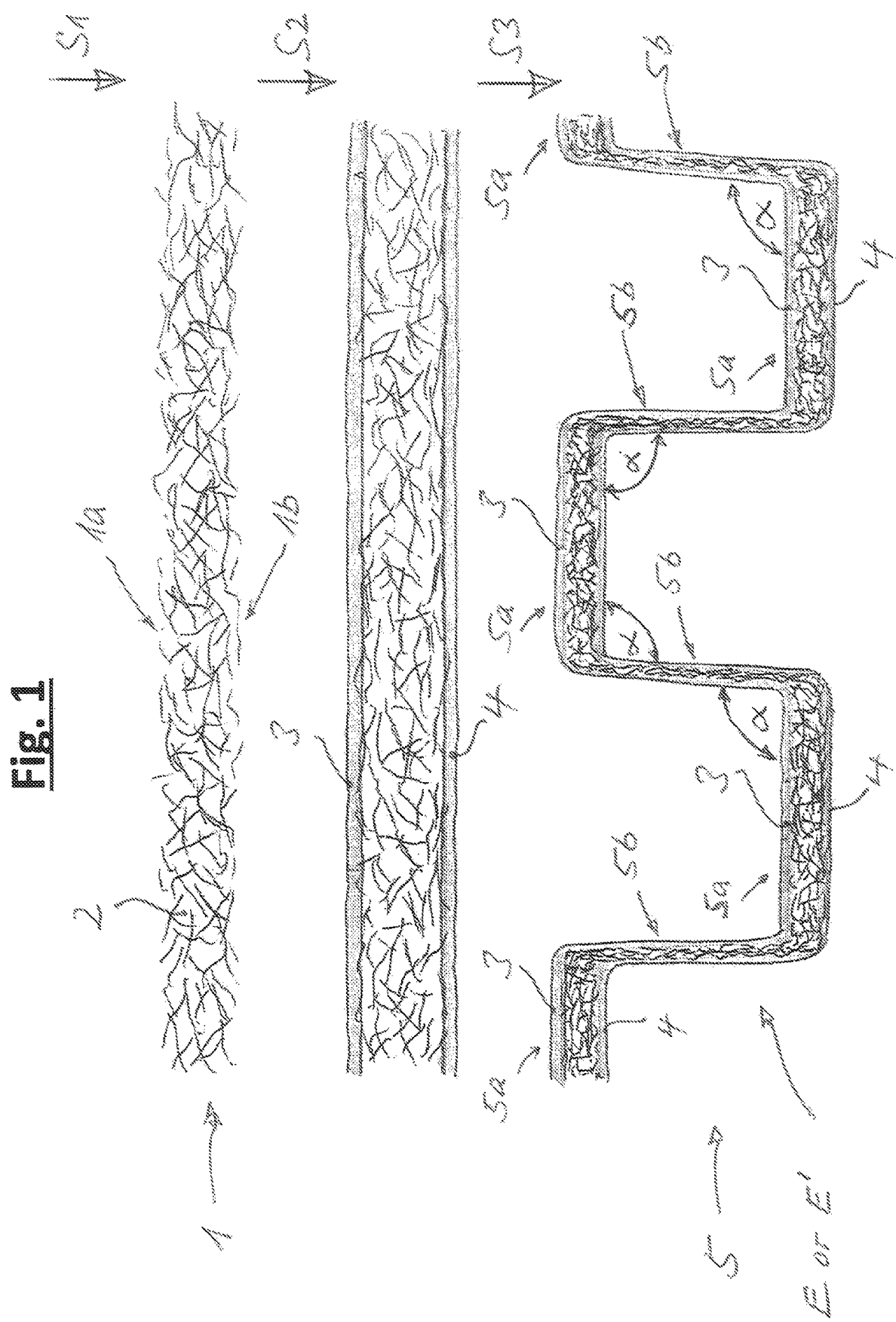
FIG. 1 is a schematic representation of the method for producing enthalpy exchanger elements according to the invention.

In FIG. 1, a schematic representation of the method for producing enthalpy exchanger elements according to the invention is shown. Cross-sections of the intermediate products, i.e. the results of each of steps S1, S2 and S3, are shown.

In a first step S1, an air-permeable sheet element 1 having voids or openings 2 is provided.

In a second step S2, both sides 1a, 1b of the sheet element 1 are laminated with a thin polymer film 3, 4 with water vapor transmission characteristics.

In a third step S3, the laminated sheet element 1 is formed into a desired shape exhibiting a three-dimensional corrugation pattern 5.

The sheet element 2 is a non-woven fabric including thermoplastic fibers only or a combination of thermoset fibers and thermoplastic fibers. The fabric may include bicomponent fibers together with standard thermoset and/or thermoplastic fibers.

The thin polymer film 3, 4 is a multilayer film which may comprise a sequence (not shown) of polymer layers of different polymer types.

The forming step S3 is a thermoforming step, preferably a vacuum forming step. At least a first mold part (e.g. lower tool, not shown) having first corrugation formations co-defining the predetermined corrugation pattern 5 of the enthalpy exchanger element E, E' to be manufactured, is used in the thermoforming step S3. In addition to the at least first mold part, a second mold part (e.g. upper tool, not shown) having second corrugation formations complementary to the first corrugation formations and/or a forming vacuum co-defining the predetermined corrugation pattern of the enthalpy exchanger element E, E' to be manufactured, is/are used in the thermoforming step S3.

The resulting enthalpy exchanger element E having a first thin polymer film 3 on the first side 1a of the sheet element 1 and a second thin polymer film 4 on the second side 1b of the sheet element 1 comprises a corrugated structure 5 with alternating squeezed portions 5a and squeezed/stretched portions 5b. The squeezed portion 5a extend in a first direction (horizontal direction in FIG. 1) and the squeezed/stretched portions 5b extend in a second direction different from the first direction. Preferably, the angle α between the first direction and the second direction in the corrugation pattern 5 of the enthalpy exchanger element E is between 90° and 120°, preferably between 95° and 105°, an example of which is shown in FIG. 1. Alternatively, unlike the example shown in FIG. 1, the angle α between the first direction and the second direction in the corrugation pattern 5 of the enthalpy exchanger element E is between 80° and 90°, preferably between 85° and 90°.

Figure 2:
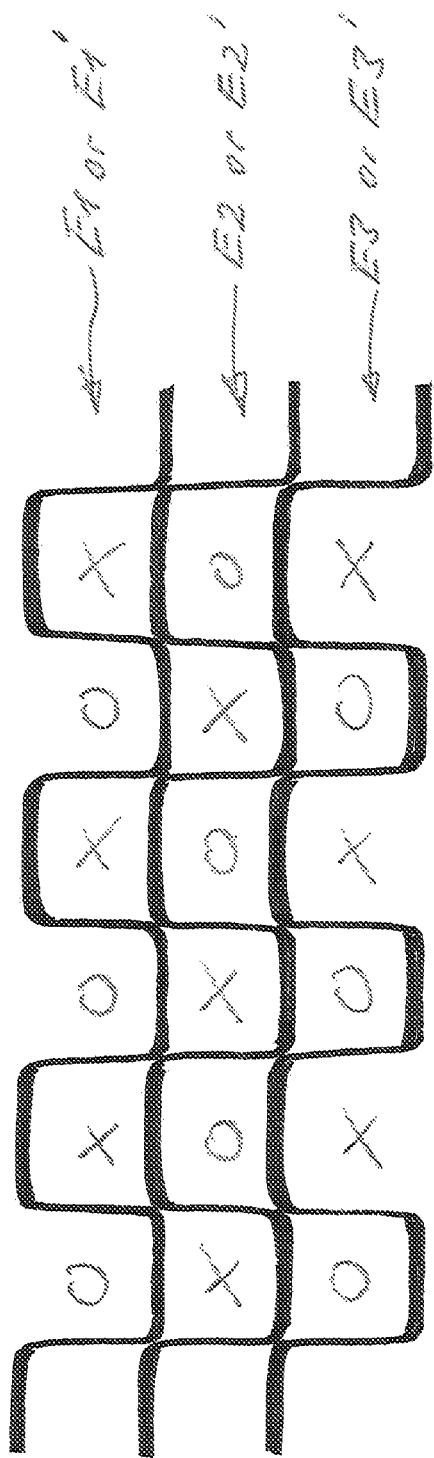
FIG. 2 is a schematic representation of an enthalpy exchanger according to the invention or a portion thereof including a plurality of enthalpy exchanger elements according to the invention.

In FIG. 2, a schematic representation of a first type enthalpy exchanger E1-E2-E3 or second type enthalpy exchanger E1'-E2'-E3' according to the invention is shown. The first type E1-E2-E3 includes a plurality of enthalpy exchanger elements E1, E2, E3 where the first thin polymer film 3 and the second thin polymer film 4 (FIG. 1) are films of the same type. The second type E1'-E2'-E3' includes a plurality of enthalpy exchanger elements E1', E2', E3' where the first thin polymer film 3 and the second thin polymer film 4 (FIG. 1) are films of different types including the case where one of the two films 3, 4 has zero thickness, i.e. the enthalpy exchanger element has only one thin polymer film 3 or 4 on one side 1a or 1b of the sheet element 1.

In FIG. 2, the outer walls of the housing/packaging of the enthalpy exchanger E1-E2-E3 or E1'-E2'-E3' is not shown. The air inlet/outlet portions (not shown) of the enthalpy exchanger E1-E2-E3 or E1'-E2'-E3' are provided with air distribution patterns such that the air flow direction in adjacent air ducts in the enthalpy exchanger E1-E2-E3 or E1'-E2'-E3' are in opposite directions, as shown by the O symbol indicating air flow towards the viewer and the X symbol indicating air flow away from the viewer.

FIG. 3 shows a SEM (scanning electron microscope) micrograph of a cross-sectional view of an air-permeable sheet element 1 laminated on its upper side 1a with a first thin polymer film 3 and laminated on its lower side 1b with a second thin polymer film 4 as a result of step b) of the method according to the invention.

The laminating step b) may comprise bonding, preferably heat bonding and/or gluing, of the thin polymer films 3, 4 to the sheet element 1. A thermoplastic adhesive (hot melt adhesive) may be used for the bonding between the polymer film 3 and 4 and the sheet element 1.

The sheet element 1 is a nonwoven fabric comprising a plurality of fibers 6. The fibers 6 may be thermoplastic fibers only or a combination of thermoset fibers and/or mineral fibers on the one hand and thermoplastic fibers on the other hand. Most preferably, the fabric includes multicomponent or bicomponent fibers together with standard thermoset and/or thermoplastic fibers. As can be best seen by comparing FIG. 3 with FIG. 4, the fibers 6 of the nonwoven fabric sheet element 1 shown in FIG. 3 are less densely packed than the fibers 6 of the nonwoven fabric sheet element 1 of the enthalpy exchanger element shown in FIG. 4.

FIG. 4 shows a SEM micrograph of a cross-sectional view of a portion of an enthalpy exchanger element E produced by forming the laminated sheet element 1 of FIG. 3 into a desired shape exhibiting a three-dimensional corrugation pattern as a result of step c) of the method according to the invention.

The forming step c) may be a pleating step or thermoforming step, preferably a vacuum forming step. At least a first mold part (e.g. lower tool, not shown) having first corrugation formations defining or co-defining the predetermined corrugation pattern of the enthalpy exchanger element E, E' to be manufactured, is provided for and used in the thermoforming step. In addition to the at least first mold part, a second mold part (e.g. upper tool, not shown) having second corrugation formations complementary to the first corrugation formations and/or a forming vacuum co-defining the predetermined corrugation pattern of the enthalpy exchanger element E, E' to be manufactured, may be provided in the thermoforming step.

The first mold part (e.g. lower tool) may comprise nozzles or through holes pneumatically connected to a vacuum source providing a vacuum for the vacuum forming step.

In addition to the first mold part and/or the second mold part used in the forming step c), preferably for supporting the vacuum action in the vacuum forming step, nozzles connected to a pressurized air source may be provided. These nozzles may be provided in the vicinity of, preferably adjacent to, the first mold part and/or the second mold part. Preferably, the pressurized air source comprises an air heating device for heating the pressurized air.

The combined use of the first tool and the vacuum source in the thermoforming step c) can be supplemented by the second tool and/or the pressurized air source, preferably with an air heating device. As a result, using at least some of these supplements, a sheet element 1 laminated with a first thin polymer film 3 and an optional second thin polymer film 4 can be pressed more strongly against the first corrugation formations of the first mold part, thus producing an enthalpy exchanger element E with a better copy of the first corrugation formations of the first mold part defining or co-defining the predetermined corrugation pattern of the enthalpy exchanger element E to be manufactured.

The sheet element 1 of the enthalpy exchanger element E has its fibers 6 much more densely packed than the sheet element 1 of FIG. 3. During the pleating or thermoforming step c), the fabric sheet element 1 with its first thin polymer film 3 and its second thin polymer film 4 is compressed and heated. At least the thermoplastic fibers or the multicomponent or bicomponent fibers of the plurality of fibers 6 are softened or partly melted during the pleating or thermoforming step c).

As a result, after cooling and hardening of the thermoplastic fibers or the multicomponent or bicomponent fibers of the plurality of fibers 6, the fabric sheet element 1 with its first thin polymer film 3 and its second thin polymer film 4 is transformed into an enthalpy exchanger element E according to the invention with a more compact fiber structure in the fabric sheet element 1 and with a three-dimensional corrugation pattern.

FIG. 5 shows a SEM micrograph similar to the one of FIG. 3 showing of a larger scale cross-sectional view of a smaller portion of the air-permeable fabric sheet element 1 laminated on its upper side 1a with the first thin polymer film 3 and laminated on its lower side 1b with the second thin polymer film 4 as a result of step b) of the method according to the invention.

FIG. 6 shows a SEM micrograph similar to the one of FIG. 4 showing of a smaller scale cross-sectional view of a larger portion of the enthalpy exchanger element E produced by the method according to the invention.

Figures 7, 8:
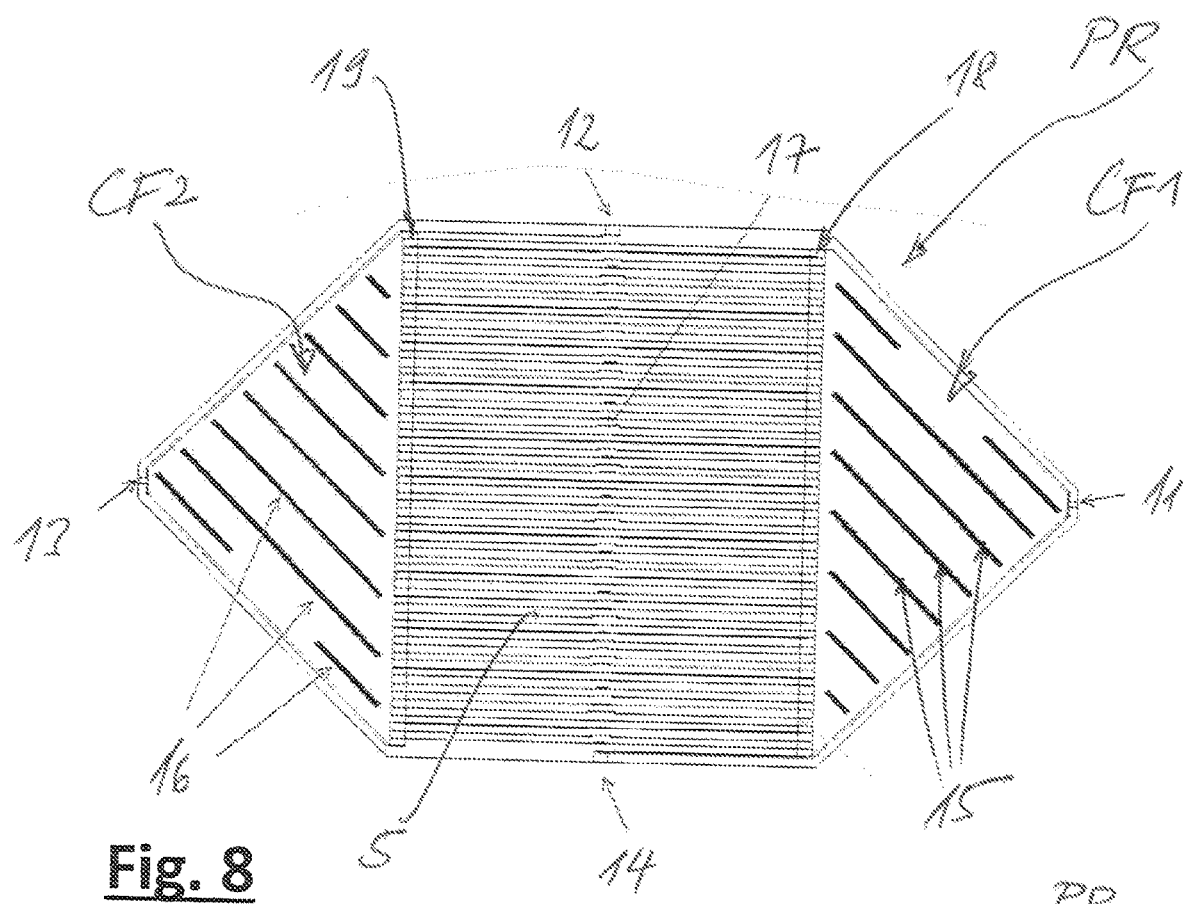
FIG. 7 is a schematic perspective view showing a right-handed enthalpy exchanger sheet element of a first embodiment according to the invention.
FIG. 8 is a schematic plan view showing the right-handed enthalpy exchanger sheet element of the first embodiment according to the invention.

FIG. 7 and FIG. 8 are a schematic perspective view and a schematic plan view, respectively of a right-handed enthalpy exchanger sheet element PR of a first embodiment according to the invention. The plate-like enthalpy exchanger element PR has a parallel flow/counter-flow region PF comprising the corrugation 5, a first cross-flow region CF1 upstream of the parallel flow/counter-flow region PF, and a second cross-flow region CF2 downstream of the parallel flow/counter-flow region PF. A plurality of such right-handed enthalpy exchanger sheet elements PR are stacked with a plurality of left-handed enthalpy exchanger sheet elements PL (not shown) to form an enthalpy exchanger stack with alternating right-handed enthalpy exchanger sheet elements PR and left-handed enthalpy exchanger sheet elements PL.

In plan view, the first and second cross-flow regions CF1 and CF2 are delimited by a triangular contour line, i.e. they have a triangular shape. Each cross-flow region CF1 and CF2 comprises a plurality of air guiding walls 15 and 16, respectively. The air guiding walls 15 are substantially parallel to each other and substantially parallel to one side of the triangular shape of the first cross-flow region CF1. Similarly, the air guiding walls 16 are substantially parallel to each other and parallel to one side of the triangular shape of the second cross-flow region CF2. The air guiding walls 15 of the first cross-flow region CF1 and the air guiding walls 16 of the second cross-flow region CF2 both extend in a direction forming an angle β of about 45° with the direction of the corrugations 5 of the parallel flow/counter-flow region PF. As a result, in the enthalpy exchanger stack with alternating right-handed enthalpy exchanger sheet elements PR and left-handed enthalpy exchanger sheet elements PL, the air guiding walls 15 of adjacent right-handed and left-handed sheet elements PR and PL extend in directions forming an angle of about 90° with respect to each other, thus defining the first cross-flow region CF1 of the enthalpy exchanger stack. Similarly, in the enthalpy exchanger stack with alternating right-handed enthalpy exchanger sheet elements PR and left-handed enthalpy exchanger sheet elements PL, the air guiding walls 16 of adjacent right-handed and left-handed sheet elements PR and PL extend in directions forming an angle of about 90° with respect to each other, thus defining the second cross-flow region CF2 of the enthalpy exchanger stack.

A first transition region 18 extends between the first cross-flow region CF1 and the parallel flow/counter-flow region PF. A second transition region 19 extends between the second cross-flow region CF2 and the parallel flow/counter-flow region PF. Both transition regions 18 and 19 comprise open ends and closed ends of the corrugations 5 and the parallel air ducts formed by the corrugations such that each closed-ended duct has an adjacent open-ended duct. The end wall of each closed-ended duct is sloped such that the wall forms an angle of 5° to 60° with respect to the longitudinal direction of the parallel air ducts. As a result, in the enthalpy exchanger stack with alternating right-handed enthalpy exchanger sheet elements PR and left-handed enthalpy exchanger sheet elements PL, resistance to air flow is minimized in the first transition regions 18 of the enthalpy exchanger stack and in the second transition regions 19 of the enthalpy exchanger stack.

The plate-like enthalpy exchanger element PR has a plurality of steps along its outer contour line. In the example shown in FIGS. 7 and 8, the plate-like enthalpy exchanger element PR has a first step 11 located at the corner of the first triangular cross-flow region CF1, a second step 12 located about halfway along the parallel flow/counter-flow region PF on one side thereof, a third step 13 located at the corner of the second triangular cross-flow region CF2 and a forth step 14 located about halfway along the parallel flow/counter-flow region PF on the other side thereof. As a result, in the enthalpy exchanger stack with alternating right-handed enthalpy exchanger sheet elements PR and left-handed enthalpy exchanger sheet elements PL, adjacent enthalpy exchanger sheet elements can be correctly positioned by fitting the steps 11, 12, 13, 14 of a right-handed enthalpy exchanger sheet element PR with the corresponding complementary steps 11, 12, 13, 14 of an adjacent left-handed enthalpy exchanger sheet element PL. In other words, a right-handed sheet element PR goes "hand in hand" and fits snugly with an adjacent left-handed sheet element PL before permanently fixing the stacked sheet elements to each other.

Also, the plate-like enthalpy exchanger element PR has an offset 17 located about halfway along the length of each duct formed by the corrugations 5. As a result, in the enthalpy exchanger stack with alternating right-handed enthalpy exchanger sheet elements PR and left-handed enthalpy exchanger sheet elements PL, adjacent enthalpy exchanger sheet elements can be correctly positioned and are prevented from slipping into each other during the stacking operation.

FIG. 9 and FIG. 10 are a schematic perspective view and a schematic plan view, respectively of a left-handed enthalpy exchanger sheet element PL of a second embodiment according to the invention. The plate-like enthalpy exchanger element PL has a parallel flow/counter-flow region PF' comprising the corrugation 5, a first cross-flow region CF1' downstream of the parallel flow/counter-flow region PF', and a second cross-flow region CF2' upstream of the parallel flow/counter-flow region PF'.

Figure 11:
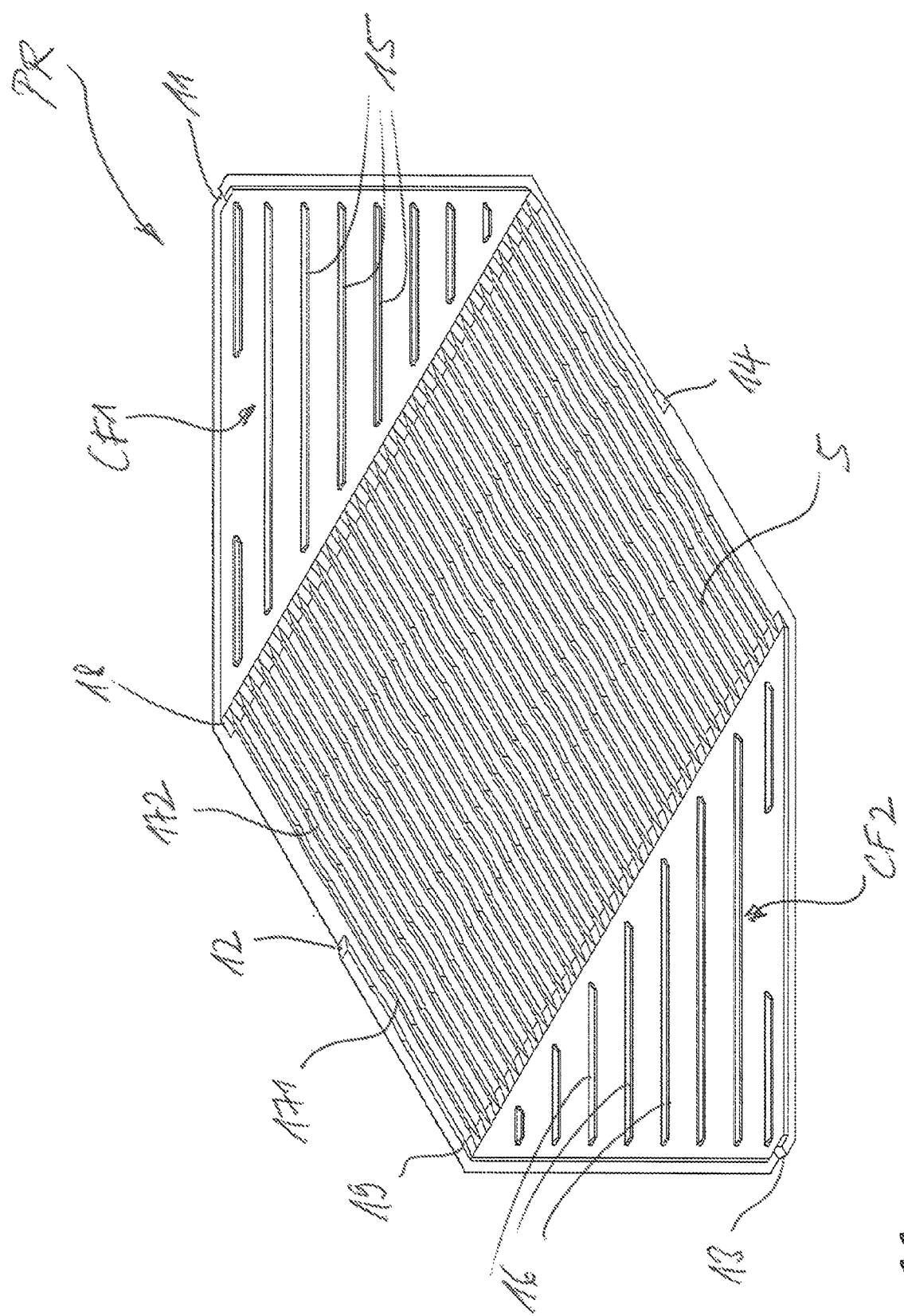
FIG. 11 is a schematic perspective view showing a right-handed enthalpy exchanger sheet element of the second embodiment according to the invention.

FIG. 11 and FIG. 12 are a schematic perspective view and a schematic plan view, respectively of a right-handed enthalpy exchanger sheet element PR of the second embodiment according to the invention. The plate-like enthalpy exchanger element PR has a parallel flow/counter-flow region PF comprising the corrugation 5, a first cross-flow region CF1 upstream of the parallel flow/counter-flow region PF, and a second cross-flow region CF2 downstream of the parallel flow/counter-flow region PF.

The difference between the second embodiment and the first embodiment is the type and number of offsets. Other than that, the right-handed plate-like enthalpy exchanger elements PR and left-handed plate-like enthalpy exchanger elements PL of the first and second embodiments are identical. In the drawings of the first and second embodiments, the same reference numerals are used for identical features in both embodiments.

Unlike the first embodiment where the right-handed plate-like enthalpy exchanger elements PR (FIGS. 7 and 8) and left-handed plate-like enthalpy exchanger elements PL (not shown) each have one offset 17 located about halfway along the length of each duct formed by the corrugations 5 in the plate elements PR and PL, the right-handed plate-like enthalpy exchanger elements PR (FIGS. 11 and 12) and left-handed plate-like enthalpy exchanger elements PL (FIGS. 9 and 10) of the second embodiment each have a first offset 171 and a second offset 172 spaced with respect to each other along the length of each duct formed by the corrugations 5 in the plate elements PR and PF. Again, as a result, in the enthalpy exchanger stack with alternating right-handed enthalpy exchanger sheet elements PR and left-handed enthalpy exchanger sheet elements PL, adjacent enthalpy exchanger sheet elements PR and PL can be correctly positioned and are prevented from slipping into each other during the stacking operation when mechanical force is exerted on the sheets and/or in operation when pressure differences between opposite air flows in adjacent parallel flow/counter flow regions PF and PF' in the enthalpy exchanger stack or block may build up.

The first offset 171 and the second offset 172 each are formed as a curved longitudinal section or as an arcuate longitudinal section within the longitudinally extending corrugations 5 in the plate elements PR and PF. As shown in FIGS. 9, 10, 11, 12 and 13, the first offsets 171 of the right-handed plate elements PR extend in a first lateral direction with respect to the longitudinal direction of the corrugations 5, and the first offsets 171 of the left-handed plate elements PL extend in a second lateral direction opposite to the first lateral direction with respect to the longitudinal direction of the corrugations 5. Similarly, the second offsets 172 of the right-handed plate elements PR extend in the second lateral direction opposite to the first lateral direction with respect to the longitudinal direction of the corrugations 5, and the second offsets 172 of the left-handed plate elements PL extend in the first lateral direction with respect to the longitudinal direction of the corrugations 5.

Again, a plurality of such right-handed enthalpy exchanger sheet elements PR (as shown in FIGS. 11 and 12) are stacked with a plurality of such left-handed enthalpy exchanger sheet elements PL (as shown in FIGS. 9 and 10) to form an enthalpy exchanger stack with alternating right-handed enthalpy exchanger sheet elements PR and left-handed enthalpy exchanger sheet elements PL. In such a stack, oppositely laterally extending first offsets 171 of adjacent sheet elements PR and PL are positioned on top of each other. Similarly, oppositely laterally extending second offsets 172 of adjacent sheet elements PR and PL are positioned on top of each other. As a result, all adjacent first offsets 171 and all adjacent second offsets 172 in the stack prevent the corrugations 5 of adjacent stacks from slipping into each other during the stacking operation and/or in operation when pressure differences between opposite air flows may build up.

FIG. 13 is a schematic plan view showing a pair of enthalpy exchanger sheet elements stacked one on top of the other, the one shown with continuous lines being the left-handed enthalpy exchanger sheet element PL as shown in FIG. 10 and the one shown with discontinuous lines being the right-handed enthalpy exchanger sheet element PR as shown in FIG. 12. Such pairs of left-handed enthalpy exchanger sheet elements PL and right-handed enthalpy exchanger sheet elements PR are stacked on top of each other to form a complete enthalpy exchanger stack or block.

REFERENCE NUMERALS 1 fabric sheet element
1a first surface
1b second surface
2 voids or openings
3 first thin polymer film
4 second thin polymer film
5 corrugation(s)
5a squeezed portion
5b squeezed and/or stretched portion
S1 providing step
S2 laminating step
S3 forming step (co-forming)
O air flow direction towards viewer
X air flow direction away from viewer
6 fiber
α angle (in corrugation pattern)
PR plate-like enthalpy exchanger element, right-handed
PL plate-like enthalpy exchanger element, left-handed
11 step
12 step
13 step
14 step
CF1 first cross flow region of PR
CF2 second cross flow region of PR
PF parallel flow/counter flow region of PR
CF1' first cross flow region of PL
CF2' second cross flow region of PL
PF' parallel flow/counter flow region of PL
15 air guiding walls (in CF1)
16 air guiding walls (in CF2)
17 offset
171 first offset
172 second offset
18 first transition region (at CF1 side)
19 second transition region (at CF2 side)
β angle between directions of corrugations and air guiding walls

The invention claimed is:

1. A method for manufacturing one or more enthalpy exchanger elements (E, E', PR, PL), the method comprising:
    a) providing an air-permeable sheet element (1);
    b) laminating at least one side (1a, 1b) of the sheet element (1) with a polymer film (3, 4) having water vapor transmission characteristics; and
    c) forming the laminated sheet element (1) into a desired shape exhibiting a three-dimensional corrugation pattern (5, 5, . . .) said corrugation pattern including one or more parallel flow regions or counter flow regions, a first cross flow region upstream of the one or more parallel flow region or counterflow region and one or more second cross flow region downstream of the one or more parallel flow region or counterflow region, wherein said first or second cross-flow region comprises a plurality of air guiding walls (15, 16);
    thereby producing one or more enthalpy exchanger elements (E, E', PR, PL) upon completing steps a-c.

2. The method according to claim 1, wherein the sheet material of the sheet element (1) comprises a polymer.

3. The method according to claim 1, wherein the sheet element (1) is a fabric.

4. The method according to claim 3, wherein a fraction of the fibers (6) of the fabric are multi-component.

5. The method according to claim 1, wherein the laminating step b) further comprises at least one of bonding, welding or gluing, of the polymer film (3, 4) to the sheet element (1).

6. The method according to claim 1, wherein the at least one polymer film (3, 4) on the at least one side (1a, 1b) of the sheet element (1) is an air-impermeable polymer film.

7. The method according to claim 1, wherein the polymer film (3, 4) is a multilayer film comprising a sequence of polymer layers of different polymer types.

8. The method according to claim 7, wherein the polymer type of each polymer layer is selected from the group consisting of polyether ester, polyether amide and polyether urethane.

9. The method according to claim 7, wherein the total thickness of the thin polymer multilayer film is between 5 μm and 200 μm.

10. The method according to claim 7, wherein the thickness of each individual polymer layer within the polymer multilayer film is between 1 μm and 20 μm.

11. The method according to claim 1, wherein the forming step c) is one of a thermoforming step, a vacuum forming step, a pleating step, or combinations thereof.

12. The method according to claim 11, wherein said laminated sheet element is formed in step c. by a first mold part having a first corrugation formation defining a predetermined corrugation pattern of the enthalpy exchanger element (E, E') to be manufactured.

13. The method according to claim 12, wherein a second mold part having second corrugation formations complementary to the first corrugation formations co-defining the predetermined corrugation pattern of the enthalpy exchanger element (E, E') to be manufactured, is provided for and used in the thermoforming step c).

14. The method according to claim 10, wherein nozzles connected to a pressurized air source provided for and used in the thermoforming step c).

15. The method according to claim 14, wherein the nozzles are provided in the vicinity of the first mold part and/or the second mold part.

16. The method of claim 1 further comprising:
   d) repeating steps a), b) and c) to produce a plurality of laminated and formed sheet elements exhibiting a three-dimensional corrugation pattern;
   e) stacking the plurality of laminated and formed sheet elements; and
   f) fixing the stacked laminated and formed sheet elements to each other.

17. An enthalpy exchanger comprising:
   at least three sheet or plate enthalpy exchanger elements (E; E', PR, PL), produced using the method as defined in claim 1;
   wherein each enthalpy exchanger element includes:
      an air-permeable sheet element (1); and
      a predetermined three-dimensional corrugation pattern (5, 5, . . . );
      wherein a first polymer film (3) is laminated to a first side (1a) of the sheet element (1) and/or a second polymer film (4) is laminated to a second side (1b) of the sheet element (1), the one or both polymer films (3, 4) having characteristics for selective water vapor transmission; and
   wherein each enthalpy exchanger element further includes a parallel flow region or counter flow region, a first cross flow region upstream of the parallel flow region or counterflow region and a second cross flow region downstream of the parallel flow region or counterflow region; and
   wherein the enthalpy exchanger elements are stacked such that right handed enthalpy exchanger elements are alternatingly stacked with left handed enthalpy heat exchanger elements.

18. The enthalpy exchanger element (E, PR, PL) according to claim 17, wherein the first polymer film (3) and the second polymer film (4) are identical to each other.

19. The enthalpy exchanger element (E', PR, PL) according to claim 17, wherein the first polymer film (3) and the second polymer film (4) are different from each other.

20. The method according to claim 3, wherein the sheet element (1) is a nonwoven fabric.

21. The method according to claim 9, wherein the total thickness of the polymer multilayer film is between 10 µm and 150 µm.

22. The method according to claim 4, wherein at least 50% by weight of the fibers (6) of the fabric are bi-component fibers.

23. The method according to claim 10, wherein the thickness of each individual polymer layer within the thin polymer multilayer film is between 4 µm and 20 µm.

24. The method according to claim 23, wherein the thickness of each individual polymer layer within the thin polymer multilayer film is between 4 µm and 15 µm.

* * * * *